United States Patent
Mall et al.

(10) Patent No.: US 7,150,091 B2
(45) Date of Patent: *Dec. 19, 2006

(54) POWDER COATING FOR GENERATOR STATOR BAR END FITTING AND METHOD FOR APPLYING THE POWDER COATING

(75) Inventors: Waheed Tony Mall, Waterford, NY (US); Roderick Mark Lusted, Niskayuna, NY (US); Yu Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/983,673

(22) Filed: Nov. 9, 2004

(65) Prior Publication Data

US 2006/0102702 A1  May 18, 2006

(51) Int. Cl.
*H02K 15/00* (2006.01)
*B23K 31/02* (2006.01)

(52) U.S. Cl. .................. 29/596; 228/119; 228/225
(58) Field of Classification Search ............... None
See application file for complete search history.

(56) References Cited

U.S. PATENT DOCUMENTS

| | | | |
|---|---|---|---|
| 2,462,821 A * | 2/1949 | Wellman ............... 427/183 |
| 3,614,493 A | 10/1971 | Collings et al. ......... 310/54 |
| 3,978,359 A | 8/1976 | Kultzow et al. ......... 310/260 |
| 4,122,870 A | 10/1978 | Hines ................. 138/109 |
| 4,199,700 A | 4/1980 | Daugherty et al. ....... 310/71 |
| 4,274,021 A | 6/1981 | Kamiya et al. .......... 310/54 |
| 4,305,792 A | 12/1981 | Kedward et al. |
| 4,806,807 A | 2/1989 | Levino ............... 310/71 |
| 4,912,831 A | 4/1990 | Levino ............... 29/596 |
| 4,982,122 A | 1/1991 | Rowe et al. .......... 310/54 |
| 5,304,877 A | 4/1994 | Baek |
| 5,316,801 A * | 5/1994 | Hopeck .............. 427/486 |
| 5,423,473 A | 6/1995 | Dailey et al. .......... 228/44 |
| 5,528,827 A | 6/1996 | Dailey et al. .......... 29/890 |
| 5,557,837 A | 9/1996 | Thiard-Laforet et al. .. 29/596 |
| 5,581,869 A * | 12/1996 | Travaly ............... 29/596 |
| 5,605,590 A * | 2/1997 | Manning et al. ........ 156/94 |
| 5,659,944 A | 8/1997 | Thiard-Laforet ........ 310/54 |
| 5,875,539 A * | 3/1999 | Kilpatrick et al. ....... 29/596 |
| 6,124,659 A | 9/2000 | Rowe et al. |
| 6,372,116 B1 | 4/2002 | Kim et al. |
| 6,447,167 B1 | 9/2002 | Kashiwada et al. |
| 6,491,208 B1 * | 12/2002 | James et al. ........... 228/119 |
| 6,778,053 B1 * | 8/2004 | Irwin et al. ........... 335/296 |
| 6,922,001 B1 * | 7/2005 | Neet et al. ............ 310/215 |
| 6,969,932 B1 * | 11/2005 | Kim et al. ............ 310/59 |
| 2005/0065294 A1 * | 3/2005 | Cramer et al. ......... 525/476 |

(Continued)

OTHER PUBLICATIONS

Cybershield, Inc. "Cybershield Electroless Plating"; 2002; 2 pages; http://www.ccoatings.com/electroless.cfm.

(Continued)

*Primary Examiner*—Lynne R. Edmondson
(74) *Attorney, Agent, or Firm*—Nixon & Vanderhye PC

(57) ABSTRACT

A method of sealing a generator stator bar and a stator bar end fitting receiving the end including the steps of: brazing the fitting to the end of the stator bar with a braze material; applying a powder coating material to the end of the stator bar in the fitting; and curing the powder coating material to form a barrier coating on the end of the stator bar and the adjoining interior surfaces of the fitting.

13 Claims, 4 Drawing Sheets

U.S. PATENT DOCUMENTS

2005/0184132 A1* 8/2005 Shabtay .................. 228/183
2005/0247762 A1* 11/2005 Breznak et al. ............ 228/245
2006/0021212 A1* 2/2006 Wang et al. ................ 29/596
2006/0080828 A1* 4/2006 Rowe ....................... 29/596

OTHER PUBLICATIONS

Cybershield, Inc. "Electroless Plating"; no date; 1 page; http://www.ccoatings.com/electroless_plating.html.

Surface Solution; "Electroless Plating"; no date; 1 page; http://www.surfacesolution.com/ElectrolessPlating.html.

Mario S. Pennisi; Powder Coating; Finishing dot com; no date; 5 pages; http://www.finishing.com/Library/pennisi/powder.html.

All About Powder Coating for Dummies; "All About Powder Coating & Frequently Asked Questions"; no date; 6 pages; http://www.arizonapowder.com/allaboutpc.html.

Dave Wright; "Powder Coating for Motorcycles"; Apr. 25, 1997; 13 pages; http://www.execpc.com/~davewrit/Powder.html.

U.S. Application of Wang et al; U.S. Appl. No. 10/978,478; "Electroless Metallic Plating for Liquid-Cooled Generator Stator Bars"; filed Nov. 2, 2004.

U.S. Application of Wang et al; U.S. Appl. No. 10/822,872; "Epoxy Spray Lining for Liquid-Cooled Generator Stator Bar Clips"; filed Apr. 13, 2004.

U.S. Application of Wang et al; U.S. Appl. No. 10/900,184; "Metallic Barrier Coating for Liquid Cooled Generator Stator Bar Clips"; filed Jul. 28, 2004.

U.S. Application of Wang et al; U.S. Appl. No. 10/990,958; "Electroplating Method for Liquid-Cooled Generator Stator Bar Clips, Electroplating Apparatus, and Electroplated Stator Bar Clip"; filed Nov. 18, 2004.

* cited by examiner

POWDER COATING FOR GENERATOR STATOR BAR END FITTING AND METHOD FOR APPLYING THE POWDER COATING

BACKGROUND OF THE INVENTION

The present invention relates to seals between generator stator bars and their end fitting connections, and to a method for sealing a stator bar end fitting to prevent or reduce corrosion due to coolant water flowing through the fitting and the stator bar.

Water-cooled stator bars for electrical generators are comprised of a plurality of small rectangular solid and hollow copper strands brazed to one another to form a bar. The ends of the strands are brazed to an end fitting, typically referred to as stator bar clip. The end fitting serves as both an electrical and a cooling flow connection for the stator bar.

The hollow end fitting typically includes an enclosed chamber for ingress or egress of stator bar cooling liquid, typically deionized water. At one end, the end fitting receives the ends of the strands of the stator bar. The fitting and the peripherally outermost copper strands of the stator bar are brazed to one another. The opposite end of the fitting is connected to a stator cooling conduit.

Liquid cooled stator bar clips have gone through design changes over the years. However, all of them contain solid strands brazed to hollow strands. During operation, the hollow strands carry water to cool off the bar. Water can corrode the copper alloy. Also, over time, leaks can develop about the connection between the stator bar ends and the stator bar fitting as well as between adjacent strands. It is believed that the leak mechanism is due to a two-part corrosion process which initiates in the braze alloy at the interior surface of the braze joint. Stagnant water in the chamber of the fitting is in contact with the braze alloy and the copper strands. This coolant contact with the braze joint and copper strands is believed to cause corrosion and consequent leakage.

Field repair of coolant leaks through the stator bar end connections has been successful. A leak site is identified by external visual examination of where the strands enter the end fitting. External visual leak detection indirectly identifies the leak site because the visible external leak on the outside of the bar and/or fitting may be a considerable distance away from a point within the fitting where the leak begins. This is particularly true if the leak is occurring between the strands of the stator bar.

An epoxy barrier coating method has been used as a leak repair and prevention method. An example of an epoxy barrier coating method is disclosed in U.S. Pat. No. 5,605,590, the disclosure of which is incorporated herein by this reference. This epoxy barrier coating has been applied to provide protection against water initiated corrosion mechanisms along the brazed length of the strand package. Epoxy coating is manually injected. The voids and air pockets are possible during injection. Thus, the process is labor intensive and requires 100% inspection. As a result, the process can be labor intensive, takes a long time to complete, and can produces defects.

There is a need for an improved barrier coating for stator bar clips. In particular there is a need for corrosion protection between the stator bars and their clips. The corrosion protection should be robust and be applicable to various stator bar clip designs, including clips for raised hollow strand stator designs.

BRIEF DESCRIPTION OF THE INVENTION

Powder coating is proposed in an embodiment of the invention to coat the stator bar clip interior, irrespective of configuration, the braze alloy, and the solid strands without clogging the hollow strands. Thus, the invention proposes a powder coating method to deposit a thin layer on the interior surface of a liquid-cooled stator bar clip. The powder coat layer provides a corrosion resistant barrier coating to prevent water access to corrosion susceptible region(s) such as clip-to-strand braze joints. In contrast to the epoxy coating method of the '590 patent, powder coating reduces labor and cycle time for coating a stator bar clip, provides improved coverage without the risk of plugging hollow cooling strands; has improved repeatability and reproducibility independent of a technicians skill level and increases reliability of the stator bar in service.

The invention may be embodied as a method of sealing the junction of a generator stator bar end and a stator bar end fitting receiving the bar, comprising: attaching the fitting to the end of the stator bar with a braze material; applying a powder coating material at least to the end of the stator bar attached to the fitting, through a chamber in the fitting; and curing the powder coating material to form a barrier coating on the end of the stator bar and the adjoining interior surfaces of the fitting.

The invention may also be embodied as a method of sealing a stator bar end to a stator bar clip, the clip having a chamber for receiving a liquid through an opening and in communication with hollow strands in said stator bar to enable coolant liquid flow through the hollow strands, said method comprising: brazing the clip to the end of the stator bar; electrostatically charging a powder coating material and spraying said powder coating material into said chamber; and curing the powder coating material to form a barrier over the end of the stator bar in the fitting.

The invention may also be embodied in an assembly comprising a stator bar end and a fitting receiving the end to define a seal substantially impermeable to liquid, the fitting having a chamber for receiving a liquid through an opening in the fitting and in communication with hollow strands forming at least a portion of said stator bar and for flow of the liquid through the hollow strands, wherein at least a portion of an interior surface of said chamber has a polymer layer powder coated and cured on a surface thereof.

The invention may also be embodied in a fitting for a stator bar of a generator comprising: a fitting housing having a collar at a first end and a cooling fluid coupling at an opposite end, wherein said collar is configured to be brazed to an end of the stator bar; a chamber extending from the first end to the opposite end of the fitting; and a polymer coating on an end of the stator bar in said chamber and forming a seal between the end and a remaining portion of the chamber.

The invention may also be embodied as method of coating the interior of a stator bar clip including the steps of electrically grounding the stator bar clip, spraying an electrostatically charged powder into the stator bar clip to form a layer of the powder thereon to a predetermined thickness and curing the powder spray-coated on the stator bar clip to form a substantially continuous corrosion barrier layer on an exposed interior surface thereof.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Water-cooled stator bars for electrical generators are comprised of a plurality of small rectangular solid and hollow copper strands which are brazed to one another and brazed to an end fitting. The end fitting serves as both an electrical and a hydraulic connection for the stator bar. The end fitting typically includes an enclosed chamber for ingress or egress of stator bar cooling liquid, typically deionized water. One end of the end fittings, more specifically the stator bar clip receives the ends of the strands of the stator bar, the clip and peripherally outermost copper strands of the stator bar being brazed to one another. Over time, leaks have variously developed about the connection between the stator bar ends and the stator bar clip as well as between adjacent strands. It is believed, based on leak analysis results, that the leak mechanism is due to a corrosion process which initiates in the braze alloy at the interior surface of the braze joint. Stagnant water in contact with the braze alloy and the copper strands is believed to cause corrosion and consequent leakage. As noted above, field repair of leaks, such as by the application of epoxy through the stator bar end connections, has only been moderately successful.

Figure 1:
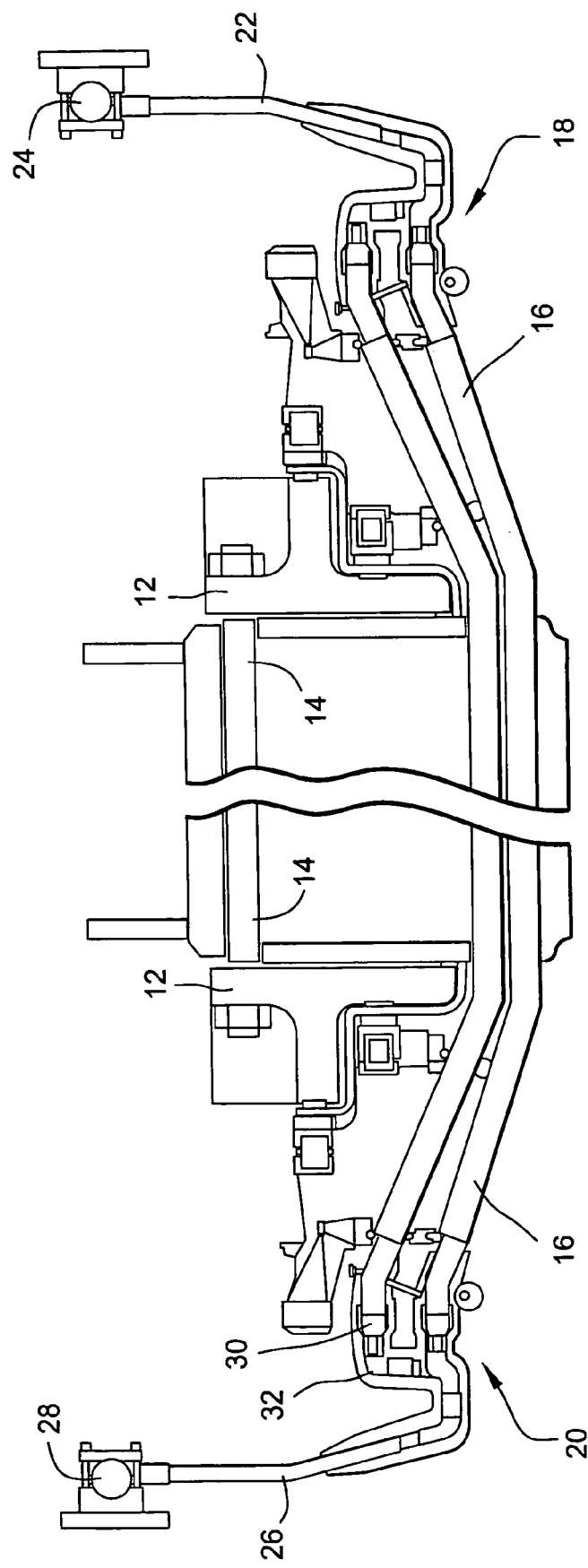
FIG. 1 is a schematic illustration of a liquid-cooled stator winding arrangement illustrating the stator bars and stator bar clips coupled to inlet and outlet coolant headers.

Referring now to the drawings, particularly to FIG. 1, there is illustrated a liquid-cooled stator winding arrangement used in a typical liquid-cooled generator. A stator core having stator core flanges 12 and core ribs 14 is illustrated, with stator bars 16 passing through radially extending slots and terminating at opposite ends in end fittings 18 and 20. Inlet tube 22 connects inlet fitting 18 to an inlet coolant header 24 and outlet hose 26 connects the outlet fitting 20 to an outlet coolant header 28.

Each fitting includes a clip 30 formed of an electrically conductive material, such as copper. The clip comprises a body having a rectilinear opening at one end for receiving the stator bar 16. Each stator bar includes a plurality of solid and hollow copper strands 32 and 34, respectively, disposed in side-by-side and superposed relation one to the other along the length of the bar. The strands are brazed to one another and the ends of the strands form the end of the stator bar.

At the opposite end, there is provided an opening which in use is normally engaged with the copper tube 22 which serves as both an electrical connection and a hydraulic connection for flowing liquid coolant, e.g., deionized water, into (or from) the chamber 36 defined by the stator bar clip 30 and the exposed ends of the solid and hollow copper strands. The liquid in the chamber either flows into the clip 30 and through the hollow strands 34 for cooling purposes when the clip comprises an inlet fitting or receives the liquid coolant from the hollow strands 34 for egress when the clip is employed as an outlet fitting.

Figure 2:
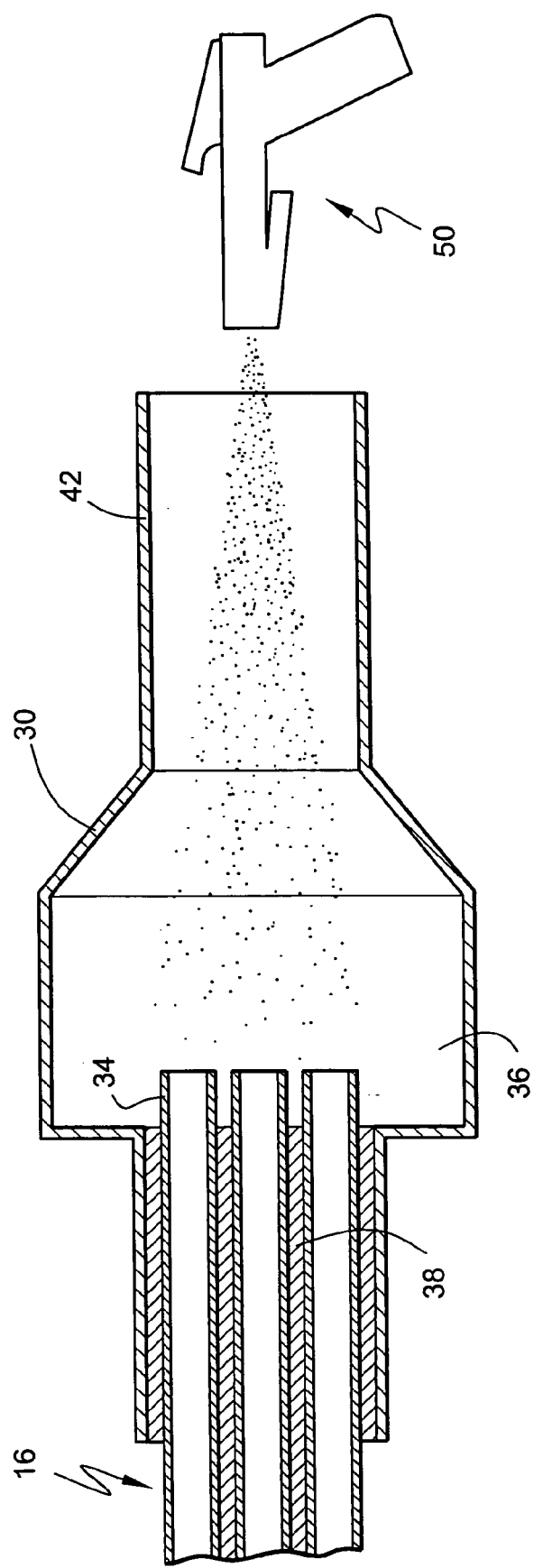
FIG. 2 is a schematic cross-sectional view of a stator bar end and stator bar clip taken along line 2—2 in FIG. 3.
Figure 3:
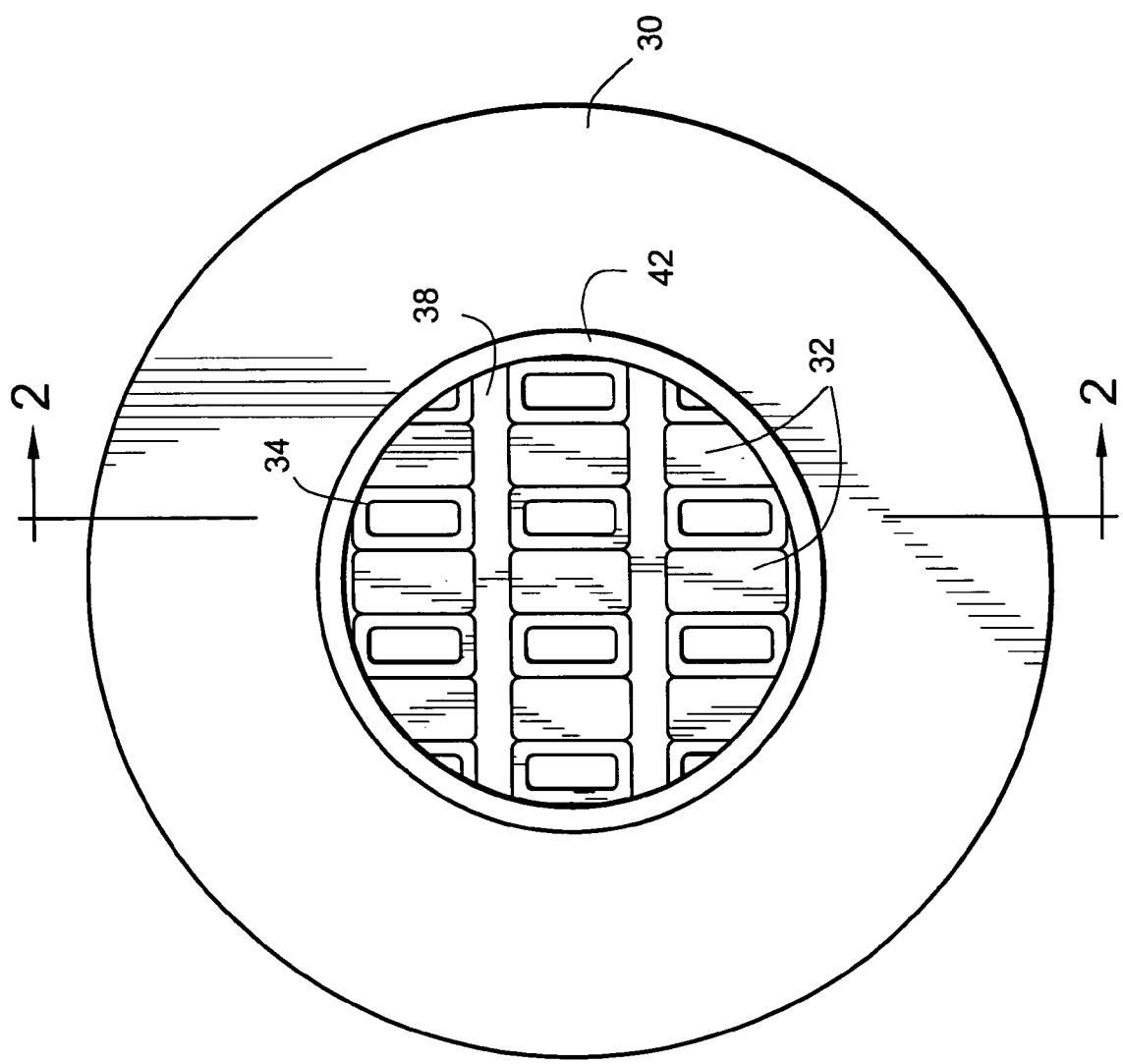
FIG. 3 is a schematic end view of the strands of a stator bar within a stator bar clip.

FIG. 2 is an end view of a stator bar and one of the stator bar clips 30. FIG. 3 is a cross-sectional side view of the end of the stator bar and its stator bar clip, schematically illustrating the powder coating process.

As noted above, the strands are brazed to one another, as well as to the inside walls of the stator bar clip as schematically illustrated by braze material 38. A conventional high-temperature phosphorous copper braze alloy, e.g., BCuP-1 or BCuP-5, may be applied to braze the strands to form the bar and to braze the end of the bar to the clip. Typically, a BCuP-5 braze alloy has a solidus temperature of 1190° Fahrenheit-F. (643° Celcius-C.), a liquidus temperature of 1475° F. (802° C.) and a brazing range of 1300° F. to 1500° F. (704° C. to 816° C.). Typically, a BCuP-1 braze alloy has a solidus temperature of 1310° Fahrenheit-F. (710° Celcius-C.), a liquidus temperature of 1688° F. (920° C.) and a brazing range of 1454° F. to 1724° F. (790° C. to 940° C.).

When the bar is brazed to the end fitting, the ends of the solid copper strands 32 are generally flush with a back wall of the expanded sub-chamber. The ends of the hollow copper strands 34, on the other hand, may extend about 10 to 500 mils beyond the ends of solid strands 32 and into the sub-chamber 36, as in the illustrated embodiment.

In powder coating, a powdered media is applied by electrostatically charging the powdered material and spraying it onto the part. The part is then heated and the powder particles melt to form a continuous film. Powders for powder coating may be either thermoplastic powders which will re-melt on heating or thermosetting powders which do not re-melt on reheating. With thermosetting powders, during the curing process, a chemical cross-linking reaction is triggered at the curing temperature and reduces chemical reaction which gives the powder coating many of its desirable properties. Ultraviolet-curable powder coatings, which are applied in the same manner as conventional powder coatings, offer some advantages including shorter cure time or lower cure temperature or both and are thus considered an appropriate alternative to conventional heat curing powders.

Examples of suitable powder resins include epoxy powder resins, silicone powder, and silicone hybrid resin systems (silicone/epoxies and silicone/acrylics), examples of which are disclosed in U.S. Pat. No. 6,778,053, the disclosure of which is incorporated herein by this reference.

As an embodiment of the invention, the interior of the stator bar clip 30, including the corrosion susceptible braze joint between the clip 30 and the stator bar 16, is powder coated so that a thin barrier layer is deposited on the interior surface. The powder coat provides a corrosion resistant barrier to prevent water access to corrosion susceptible region(s) such as the clip-to-strand braze joints.

The pre-requisite for any good coating is preparation. The preparation treatment will differ for various materials. The goal of the preparation is for oil, dirt and grease to be removed. A grounding strap is also connected to the frame of the machine and to the terminal connections.

As noted above, the powder is typically applied with an electrostatic spray gun to a part that is at earth, (or ground) potential. As an embodiment of the invention, a thermoset epoxy powder containing various curing and flow control agents is spray coated onto the interior of the stator bar clip using an electrostatic spray coating system, such as a manual spray gun manufactured by the Nordson Corporation, Westlake, Ohio, under the trade name SureCoat®, which provides electrically charged powder coating material for spraying onto the grounded stator bar clip. Not all powder is applied using guns, however. Other processes such as electrostatic tunnels may be used and, therefore, the invention is not limited to an electrostatic gun 50 as schematically illustrated. As illustrated in FIG. 2, powder coating may be facilitated by isolating the target stator bar clip, including the braze joint between it and the stator bar, such as by partial disassembly to provide access to the end 42 of the clip 30 remote from the stator bar 16.

Before the powder is sent to the gun, it is fluidized to separate the individual grains of powder and so improve the electrostatic charge that can be applied to the powder and so that the powder flows more easily to the gun. By grounding the clip and strands and directing the gun to spray the electrostatically charged epoxy particles into the clip, the particles will be attracted and adhere to the clip, strands, and braze joints therebetween. Additionally, the electrostatic charge affords sufficient attraction of the charged epoxy particles to the grounded structure that the powder will be drawn to all sides of the hollow strands and interior surfaces of the clip to provide a uniform film build-up. Thus, powder coating is not prone to air bubbles and voids that can be caused by human error during epoxy injection process. Also, the powder coating is attracted to the copper surface of the bar and clip, with the exposed surface having a greater attraction than a previously coated area, thereby increasing the likelihood of a uniform coat. This electrostatic feature of the process enables effective material utilization and consistent finish characteristics. The powder will remain attached to the part as long as some of the electrostatic charge remains on the powder.

A conventional electrostatic powder spray system has a hi-voltage, low amperage powder unit which supplies an electrode at the front of the gun 50 sufficient voltage to emit a field charge which is imparted to the powder material as it is propelled towards the interior surface of the stator bar clip/stator bar. Once charged, the particles are drawn to and attach themselves to the grounded structure. When applying the coating, the voltage should be sufficiently high to provide a substantial deposition rate but not too high such that the electrostatic charge on the powder already deposited will tend to repel additional powder. Further, the flow rate air pressure should be sufficiently high to afford an adequate deposition rate but not too high as to decrease the amount of electrostatic wrap. Preferably, low atomizing air pressure will afford a better coverage than higher pressures.

Powder coatings can be applied over a wide range of thicknesses. Typically, 25 micron is considered a minimum for mild interior applications up to 60 micron minimum for exterior applications. Preferably, the powder coating thickness should be from about 0.002 to about 0.050 inches thick, more preferably about 0.018 to about 0.020 inches thick, to provide adequate protection to act as a water barrier but not so thick as to cause cracking nor to clog the hollow strands.

To obtain the final solid, tough, coating, the powder coat is cured. The curing method depends upon the particular powder selected and may be by heating and/or by UV cure, for example. Curing the coating will occur in the field or in the factory. Field cure will be limited to repair and recondition work. Heating the powder coating in the field can be achieved with localized methods such as heat tapes or with local heaters. In the alternative, a UV curing powder coating may be used and UV cured in the field.

In one example, the structure may be heated to a range of about 120°–210° C. over up to about two hours, depending on the composition of the powder coat, whereby the coating will flow and cure to provide a uniform barrier coating over the end of the stator bar, the braze joints and the interior of the clip, thereby to serve as a seal between the liquid coolant and the copper strands and brazing alloy applied to the strands, sealing potential leakage paths within the fitting. To facilitate obtaining a uniform coating thickness, the structure may be preheated to approximately 100° C. such that some melting or flowing of the solid epoxy powder occurs upon initial application of powder.

A bore scope or other inspection instrument may be inserted into the chamber so that a technician may view the end of the stator bar and the coating material to confirm that the coating material is at the bottom of the sub-chamber and on the stator bar, and that the ends of the hollow strands extend up through the coating. This inspection may be accomplished when the coating material is initially applied to the fitting and/or after the coating material has been cured within the clip.

Figure 4:
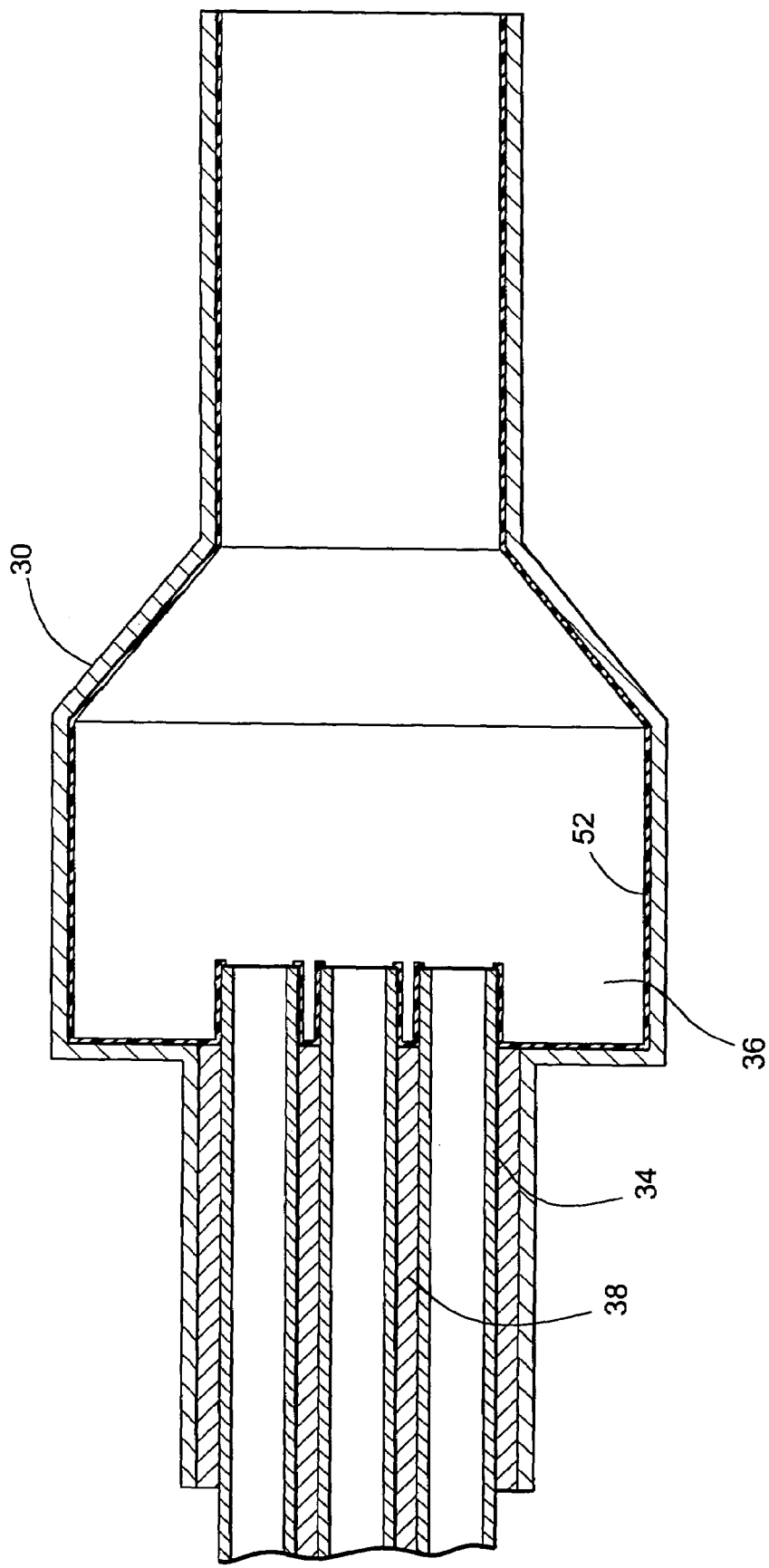
FIG. 4 is a schematic cross-sectional view similar to FIG. 2, after application of a powder coating as an embodiment of the invention.

As a result of this process, a uniform barrier coating of, e.g., cured epoxy is provided, for example, as illustrated at 52 in FIG. 4, on the interior surface of the clip, including on the exposed ends of the strands and the braze material joining the strands to each other and to the clip. The powder, because of its charge and by grounding the clip/strand, wraps around all surfaces to a substantially uniform thickness, as illustrated, prior to being cured. It will therefore be appreciated that, simply by spraying charged powder, the interior surface is completely and uniformly coated without clogging the hollow strands.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of sealing the junction of a generator stator bar end and a stator bar end fitting receiving the bar, comprising:

attaching the fitting to the end of the stator bar with a braze material;

applying a powder coating material at least to the end of the stator bar attached to the fitting, through a chamber in the fitting; and curing the powder coating material to form a barrier coating on the end of the stator bar and the adjoining interior surfaces of the fitting, wherein said applying comprises electrostatically charging the powder coating material and spraying said powder coating material into said chamber.

2. The method as in claim 1, wherein said curing includes heating the fitting.

3. The method as in claim 1, wherein attaching the fitting comprises brazing the fitting and stator bar with a phosphorous copper braze alloy and the powder coating material comprises a thermosetting epoxy.

4. The method as in claim 1, wherein the fitting comprises a stator bar clip.

5. A method of sealing a stator bar end to a stator bar clip, the clip having a chamber for receiving a liquid through an opening and in communication with hollow strands in said stator bar to enable coolant liquid flow through the hollow strands, said method comprising:

brazing the clip to the end of the stator bar;

electrostatically charging a powder coating material and spraying said powder coating material into said chamber; and curing the powder coating material to form a barrier over the end of the stator bar in the fitting.

6. The method as in claim 5, wherein said curing includes heating the fitting.

7. The method as in claim 5, wherein said stator bar further comprises solid strands and said hollow strands extend into said chamber a distance greater than said solid strands.

8. The method of claim 5, wherein brazing the clip comprises brazing the clip and stator bar with a phosphorous copper braze alloy and the coating material comprises a thermosetting epoxy.

9. A method of coating the interior of a stator bar clip including the steps of electrically grounding the stator bar clip, spraying an electrostatically charged powder into the stator bar clip to form a layer of the powder thereon to a predetermined thickness and curing the powder spray-coated on the stator bar clip to form a substantially continuous corrosion barrier layer on an exposed interior surface thereof.

10. The method as in claim 1, wherein said powder coating material comprises a polymer.

11. The method as in claim 5, wherein said powder coating material comprises a polymer.

12. The method as in claim 9, wherein said powder coating material comprises a polymer.

13. The method as in claim 9, wherein said curing includes heating the stator bar clip.

* * * * *